United States Patent
Khay-Ibbat et al.

(10) Patent No.: US 9,521,699 B2
(45) Date of Patent: *Dec. 13, 2016

(54) OFFLOADING A VIDEO PORTION OF A VIDEO CALL

(71) Applicant: Apple Inc., Cupertino, CA (US)

(72) Inventors: Samy Khay-Ibbat, San Francisco, CA (US); Sarma V. Vangala, San Jose, CA (US); Paul V. Flynn, Menlo Park, CA (US); Wen Zhao, San Jose, CA (US); Sreevalsan Vallath, Dublin, CA (US); Navid Damji, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/040,934

(22) Filed: Feb. 10, 2016

(65) Prior Publication Data

US 2016/0249399 A1    Aug. 25, 2016

Related U.S. Application Data

(63) Continuation of application No. 14/109,659, filed on Dec. 17, 2013, now Pat. No. 9,277,176.

(Continued)

(51) Int. Cl.
*H04N 7/14* (2006.01)
*H04W 76/02* (2009.01)
(Continued)

(52) U.S. Cl.
CPC .......... *H04W 76/026* (2013.01); *H04N 7/147* (2013.01); *H04W 28/0252* (2013.01); *H04W 76/064* (2013.01); *H04W 84/12* (2013.01)

(58) Field of Classification Search
CPC ....................................... H04N 7/14
(Continued)

(56) References Cited

U.S. PATENT DOCUMENTS 5,844,600 A    12/1998 Kerr
8,582,726 B2   11/2013 Tapio et al.
(Continued)

OTHER PUBLICATIONS

Yap et al., "Making Use of All the Networks Around Us: A Case Study in Android", In Proceedings of the 2012 ACM SIGCOMM workshop on Cellular networks: operations, challenges, and future design, pp. 19-24, ACM, 2012.

*Primary Examiner* — Olisa Anwah
(74) *Attorney, Agent, or Firm* — Downey Brand LLP

(57) ABSTRACT

A method for offloading a video portion of a video call form a cellular network to a WLAN is provided. The method can include a wireless communication device participating in a video call with a remote device over a connection between the wireless communication device and a cellular network. The video call can include a first video stream carried over a first bearer on the cellular network and an audio stream carried over a second bearer on the cellular network. The method can further include the wireless communication device establishing a connection between the wireless communication device and a WLAN; performing a call setup procedure with the remote device to establish a second video stream over the WLAN; terminating the first video stream; and using the second video stream and the audio stream to continue the video call.

20 Claims, 7 Drawing Sheets

Related U.S. Application Data

(60) Provisional application No. 61/745,459, filed on Dec. 21, 2012.

(51) Int. Cl.
*H04W 28/02* (2009.01)
*H04W 76/06* (2009.01)
*H04W 84/12* (2009.01)

(58) Field of Classification Search
USPC .................. 348/14.01, 14.02, 14.11, 14.12
See application file for complete search history.

(56) References Cited

U.S. PATENT DOCUMENTS

| | | | |
|---|---|---|---|
| 2009/0092093 A1* | 4/2009 | Wu .................. | H04W 36/0033 370/331 |
| 2011/0249079 A1 | 10/2011 | Santamaria et al. | |
| 2012/0066596 A1 | 3/2012 | Feng et al. | |
| 2012/0281673 A1 | 11/2012 | Nix | |
| 2013/0003652 A1 | 1/2013 | Rados et al. | |
| 2013/0242964 A1 | 9/2013 | Hassan et al. | |
| 2013/0250032 A1 | 9/2013 | Andre-Jonsson | |
| 2014/0106709 A1 | 4/2014 | Palamara et al. | |
| 2014/0162676 A1 | 6/2014 | Shaw | |

\* cited by examiner

OFFLOADING A VIDEO PORTION OF A VIDEO CALL

CROSS-REFERENCE TO RELATED APPLICATION

This application is a continuation of U.S. patent application Ser. No. 14/109,659, filed Dec. 17, 2013, which claims the benefit of U.S. Provisional Patent Application No. 61/745,459, filed Dec. 21, 2012, both of which are incorporated by reference herein in their entireties.

FIELD

The described embodiments relate generally to wireless communications. More particularly, the present embodiments relate to offloading a video portion of a video call.

BACKGROUND

Many modern wireless communication devices include cameras enabling the devices to support video calls, which can include both video and audio. These video calls can be established and supported over modern cellular networks, such as Long Term Evolution (LTE) networks, which can support packet switched data at a sufficient rate to support streaming video. However, video calls are relatively data intensive sessions, which can be costly to users when performed over cellular networks, as cellular network operators often impose data caps and/or data charges on subscribers for data usage over cellular networks.

Many wireless local area networks (WLANs) offer free data usage to users. As such, many users prefer to use a WLAN connection to perform data intensive operations, such as video calls when WLAN access is available. However, as WLAN coverage is not universal, many data sessions are established over cellular networks by necessity when a user is not within coverage range of a WLAN to which he or she has access privileges. Some wireless communication devices support offloading of cellular data traffic to a WLAN connection when a device comes within WLAN coverage so as to mitigate cellular data charges. However, offloading a real time session, such as a video call, can be problematic, as using existing techniques to offload a video call to a WLAN can result in a noticeable call interruption and/or call drops.

SUMMARY

Some example embodiments disclosed herein provide for offloading a video portion of a video call from a cellular network to a WLAN. In accordance with some example embodiments, offloading the video stream portion can be performed without interrupting the voice call. As the video stream portion of the call can be the most data intensive portion of the call, offloading the video stream to a WLAN in accordance with such example embodiments can reduce data costs that can be incurred by a user on a cellular network. Further, in some example embodiments, an audio portion of the video call can remain on the cellular network, which can provide a guaranteed quality of service for the audio. As such, parties to a video call can enjoy both reduced data costs offered by handling the video data over a WLAN connection and a high quality of service for audio data that can be offered by a cellular network. Further, cellular network operators can benefit from reduced data load on the network, as video traffic can be offloaded to a WLAN.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Some example embodiments disclosed herein provide for offloading a video portion of a video call. In this regard, some example embodiments provide for offloading a video stream for a video call from a cellular network to a WLAN in the event that a device comes within WLAN coverage after establishment of a video call on a cellular network. In accordance with some example embodiments, offloading the video stream portion can be performed without interrupting the video call. As the video stream portion of the call can be the most data intensive portion of the call, offloading the video stream to a WLAN in accordance with such example embodiments can reduce data costs that can be incurred by a user. Further, in some example embodiments, an audio portion of the video call can remain on the cellular network, which can provide a guaranteed quality of service for the audio. As such, parties to a video call can enjoy both reduced data costs offered by handling the video data over a WLAN connection and a high quality of service for audio data that can be offered by a cellular network.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
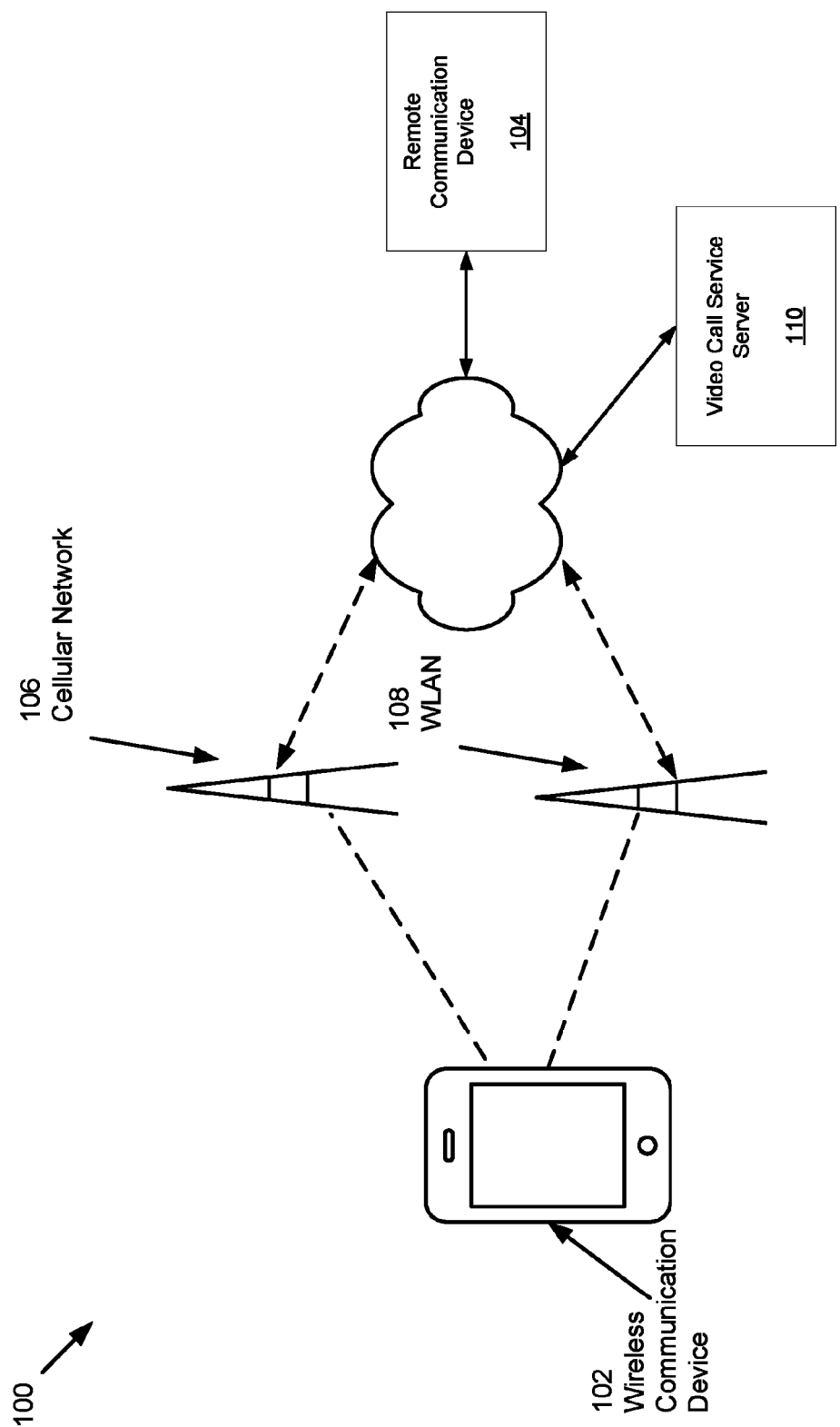
FIG. 1 illustrates a wireless communication system in accordance with some example embodiments.

FIG. 1 illustrates an example wireless communication system 100 in accordance with some example embodiments. The system 100 can include a wireless communication device 102, which can establish a video call with a remote communication device 104. By way of non-limiting example, the wireless communication device 102 can be a cellular phone, such as a smart phone device, a tablet computing device, a laptop computing device, or other computing device that can be configured to connect to both a cellular network 106 and a WLAN 108.

The remote communication device 104 can be embodied as any device that can be configured to engage in a video call over a network connection, including, for example, a video phone, a cellular phone, a tablet computing device, a laptop computing device, a desktop computer, or other computing device. In some example embodiments, the remote communication device 104 can be embodied as a second wireless communication device 102. The remote communication device 104 can be configured to use any access technology to access a network to engage in a video call and/or other communication session with the wireless communication device 102. By way of non-limiting example, the remote communication device 104 of some example embodiments may be configured to use a cellular technology, WLAN access technology, and/or other wireless communications technology to access a network and engage in a communication session with the wireless communication device 102. As a further example, in some embodiments, the remote communication device 104 may use a wireline connection, such as a digital subscriber line (DSL), cable internet, and/or other wireline network connection and/or other wireless communications technology to access a network and engage in a communication session with the wireless communication device 102.

The cellular network 106 can be any cellular network that can support packet switched (PS) data transmission for a video call, including PS video data transmission and voice over Internet Protocol (VoIP) transmission and/or other PS protocol for transmission of audio data for the video call. In some example embodiments, the cellular network 106 can be a fourth generation (4G) cellular network, such as a 4G network implementing an LTE technology, such as an LTE network, an LTE-Advanced (LTE-A) network, and/or the like, which can support both PS video data transmission and voice over LTE (VoLTE) transmission of audio data for a video call. However, it will be appreciated that the cellular network 106 of some embodiments can implement some other existing and/or future-developed cellular networking technology, such as various fifth generation (5G) and beyond cellular networking technologies, capable of supporting PS data transmission of both video and audio data for a video call.

The WLAN 108 can be any WLAN, such as a private WLAN, public WLAN, home WLAN, commercial WLAN, or the like. The WLAN 108 can use any appropriate WLAN technology, including, but not limited to a Wi-Fi technology based on an Institute of Electrical and Electronics Engineers (IEEE) 802.11 standard (e.g., 802.11a, 802.11b, 802.11g, 802.11n, 802.11ac, 802.11ad, and/or other present or future developed version of 802.11).

In some example embodiments, the system 100 can further include a video call service server 110. In embodiments including the video call service server 110, the video call service server 110 can be an entity configured to support establishment and/or maintenance of a video call between the wireless communication device 102 and remote communication device 104. As an example, the wireless communication device 102 and/or remote communication device 104 of some example embodiments can be configured to register an Internet Protocol (IP) address and/or other device address with the video call service server 110 to facilitate communication path establishment and/or other video call establishment and handling procedures. In some example embodiments, the video call service server 110 can be implemented as an Apple® FaceTime® server. It will be appreciated, however, that the video call service server 110 can be omitted in some embodiments and video calls can be established without use of a support server in such embodiments.

Figure 2:
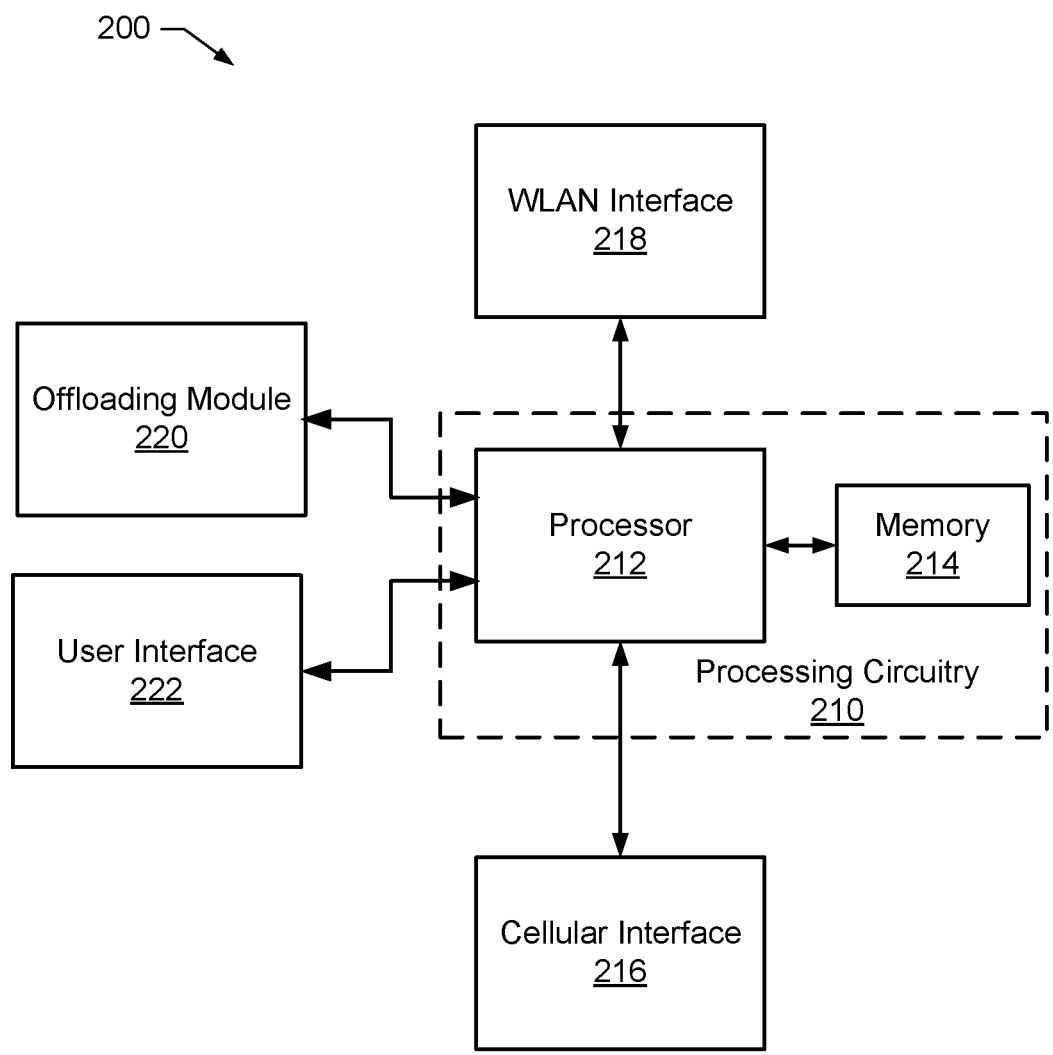
FIG. 2 illustrates a block diagram of an apparatus that can be implemented on a wireless communication device in accordance with some example embodiments.

FIG. 2 illustrates a block diagram of an apparatus 200 that can be implemented on a wireless communication device 102 in accordance with some example embodiments. In this regard, when implemented on a computing device, such as wireless communication device 102, apparatus 200 can enable the computing device to operate within the system 100 in accordance with one or more example embodiments. It will be appreciated that the components, devices or elements illustrated in and described with respect to FIG. 2 below may not be mandatory and thus some may be omitted in certain embodiments. Additionally, some embodiments can include further or different components, devices or elements beyond those illustrated in and described with respect to FIG. 2.

In some example embodiments, the apparatus 200 can include processing circuitry 210 that is configurable to perform actions in accordance with one or more example embodiments disclosed herein. In this regard, the processing circuitry 210 can be configured to perform and/or control performance of one or more functionalities of the apparatus 200 (e.g., of the wireless communication device 102) in accordance with various example embodiments, and thus can provide means for performing functionalities of the apparatus 200 in accordance with various example embodiments. The processing circuitry 210 can be configured to perform data processing, application execution and/or other processing and management services according to one or more example embodiments.

In some embodiments, the apparatus 200 or a portion(s) or component(s) thereof, such as the processing circuitry 210, can include one or more chipsets, which can each include one or more chips. The processing circuitry 210 and/or one or more further components of the apparatus 200 can therefore, in some instances, be configured to implement an embodiment on a chipset. In some example embodiments in which one or more components of the apparatus 200 are embodied as a chipset, the chipset can be capable of enabling a computing device to operate in the system 100 when implemented on or otherwise operably coupled to the computing device. Thus, for example, one or more components of the apparatus 200 can provide a chipset(s), such as by way of non-limiting example, a cellular baseband chipset and/or WLAN chipset, configured to enable a computing device to operate over the cellular network 106 and/or the WLAN 108.

In some example embodiments, the processing circuitry 210 can include a processor 212 and, in some embodiments, such as that illustrated in FIG. 2, can further include memory 214. The processing circuitry 210 can be in communication with or otherwise control a cellular interface 216, WLAN interface 218, offloading module 220, and/or user interface 222.

The processor 212 can be embodied in a variety of forms. For example, the processor 212 can be embodied as various hardware-based processing means such as a microprocessor, a coprocessor, a controller or various other computing or processing devices including integrated circuits such as, for example, an ASIC (application specific integrated circuit), an FPGA (field programmable gate array), some combination thereof, or the like. Although illustrated as a single processor, it will be appreciated that the processor 212 can comprise a plurality of processors. The plurality of processors can be in operative communication with each other and can be collectively configured to perform one or more functionalities of the apparatus 200 as described herein. In some example embodiments, the processor 212 can be configured to execute instructions that can be stored in the memory 214 or that can be otherwise accessible to the processor 212. As such, whether configured by hardware or by a combination of hardware and software, the processor 212 capable of performing operations according to various embodiments while configured accordingly.

In some example embodiments, the memory 214 can include one or more memory devices. Memory 214 can include fixed and/or removable memory devices. In some embodiments, the memory 214 can provide a non-transitory computer-readable storage medium that can store computer program instructions that can be executed by the processor 212. In this regard, the memory 214 can be configured to store information, data, applications, instructions and/or the like for enabling the apparatus 200 to carry out various functions in accordance with one or more example embodiments. In some embodiments, the memory 214 can be in communication with one or more of the processor 212, cellular interface 216, WLAN interface 218, offloading module 220, or user interface 222 via a bus(es) for passing information among components of the apparatus 200.

The apparatus 200 can further include a cellular interface 216. The cellular interface 216 can be configured to enable the apparatus 200 to establish and support a connection to the cellular network 106. As such, the cellular interface 216 can include, for example, an antenna (or multiple antennas) and supporting hardware and/or software for enabling communications with a cellular network. In some example embodiments, the cellular interface 216 can be at least partially implemented as a cellular chipset, which can enable a computing device to operate on a cellular network when implemented on the device.

The apparatus 200 can additionally include a WLAN interface 218. The WLAN interface 218 can be configured to enable the apparatus 200 to establish and support a connection to the WLAN 108. As such, the WLAN interface 218 can include, for example, an antenna (or multiple antennas) and supporting hardware and/or software for enabling communications with a WLAN. In some example embodiments, the WLAN interface 218 can be at least partially implemented as a WLAN chipset, which can enable a computing device to operate on a WLAN when implemented on the device.

The apparatus 200 can further include offloading module 220. The offloading module 220 can be embodied as various means, such as circuitry, hardware, a computer program product including a computer readable medium (for example, the memory 214) storing computer readable program instructions that are executable by a processing device (for example, the processor 212), or some combination thereof. In some embodiments, the processor 212 (or the processing circuitry 210) can include, or otherwise control the offloading module 220. The offloading module 220 can be configured to manage or otherwise support offloading a video portion of a video call from the cellular network 106 to the WLAN 108 in accordance with various example embodiments. In some example embodiments, the offloading module 220 can be further configured to manager telephony functions for the wireless communication device 102 and/or can be configured to manage WLAN and cellular coexistence.

The apparatus 200 of some example embodiments can further include user interface 222. The user interface 222 may be in communication with the processing circuitry 210 to receive an indication of a user input and/or to provide an audible, visual, mechanical, or other output to a user. As such, the user interface 222 may include, for example, a keyboard, a mouse, a joystick, camera, a display, a touch screen display, a microphone, a speaker, and/or other input/output mechanisms. In this regard, the user interface 222 may provide input/output mechanisms enabling presentation of a video call, such as a display for display of video for a video call, a speaker for play out of audio for a video call, a camera for capturing video, a microphone for capturing audio, and/or other input/output mechanisms that may facilitate participation in a video call.

In accordance with various example embodiments, the wireless communication device 102 and remote communication device 104 can establish a video call. The video call can, for example, be supported by a video call application, such as, by way of non-limiting example, Apple® FaceTime®, which can be implemented on the wireless communication device 102 and/or on the remote communication device 104.

In some instances, such as when the wireless communication device 102 is not within coverage range of a WLAN, such as the WLAN 108, the wireless communication device 102 can establish the video call over a connection to the cellular network 106. Additionally or alternatively, in some example embodiments, a video call can be moved to the cellular network 106 after being established on another network, such as the WLAN 108. When serviced by the cellular network 106, a video call in accordance with various example embodiments can include a video stream that can be carried over a first bearer on the cellular network 106 and an audio stream that can be carried over a second bearer on the cellular network 106. The bearer carrying the audio stream can, for example, be a QCI1 bearer or other bearer, which can provide a guaranteed quality of service for supporting voice transmission. In some example embodiments, the bearer carrying the audio stream can be a voice over LTE (VoLTE) bearer. For example, in some scenarios, such as embodiments in which the remote communication device 104 is connected to an LTE network, the audio stream can be provided via end-to-end VoLTE. The audio stream can be carried as PS audio data over the cellular network 106.

As will be described further herein below, some example embodiments provide for offloading a video portion of a video call from the cellular network 106 to the WLAN 108. For example, some example embodiments provide for establishing a second, parallel video stream for the video call over the WLAN 108, such as in response to the wireless communication device 102 coming within a coverage range of the WLAN 108. After establishment of the second video stream, the video stream carried over the cellular network 106 can be terminated. In this regard, the second video stream on the WLAN 108 can be used to continue the video call, thus enabling termination of the video stream carried over the cellular network 106. Accordingly, the data intensive video stream can be offloaded to the WLAN 108, thus potentially reducing cellular data costs, while the audio stream can remain serviced by the cellular network 106, which can provide a guaranteed quality of service to support the audio data.

Figure 3:
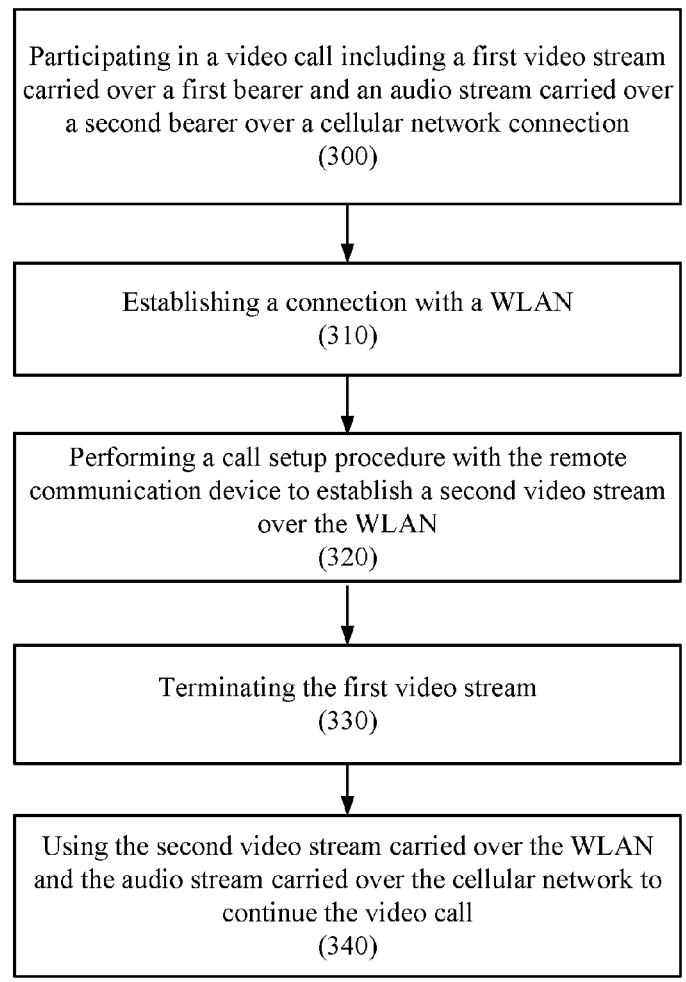
FIG. 3 illustrates a flowchart of operations that can be performed by a wireless communication device in accordance with an example method for offloading a video portion of a video call according to some example embodiments.

FIG. 3 illustrates a flowchart of operations that can be performed by a wireless communication device 102 in accordance with an example method for offloading a video portion of a video call according to some example embodiments. One or more of processing circuitry 210, processor 212, memory 214, cellular interface 216, WLAN interface 218, or offloading module 220 can, for example, provide means for performing the operations illustrated in and described with respect to FIG. 3.

Operation 300 can include the wireless communication device 102 participating in a video call with the remote communication device 104 over a connection to the cellular network 106. The video call can include a first video stream carried over a first bearer and an audio stream carried over a second bearer over the connection to the cellular network 106. The video call may, for example, have originally been established on the cellular network 106, such as at a point at which the wireless communication device 102 was not within range of, or otherwise did not have an active connection to the WLAN 108. Alternatively, the video call may have been moved to the cellular network 106 from another network, such as from a WLAN after the wireless communication device 102 moved outside of a coverage range of the network on which the video call was originally established.

Operation 310 can include the wireless communication device 102 establishing a connection with the WLAN 108. Operation 320 can include the wireless communication device 102 performing a call setup procedure with the remote communication device 104 to establish a second video stream for the video call over the WLAN 108. The video data content of the second video stream can be duplicative of the video stream carried over the cellular network 106. The second video stream can use a common synchronization mechanism and/or compatible synchronization mechanisms for the second video stream and the audio stream. For example, a real time transport protocol, such as, by way of non-limiting example, real-time control protocol (RTCP), supporting corresponding time stamps and/or other mechanism that can be used to synchronize audio and video packets exchanged over the separate video and audio streams can be used. In some example embodiments, such as the embodiment illustrated in and described below with respect to FIG. 5, the wireless communication device 102 can be configured to measure a signal strength and/or other quality of the WLAN 108 prior to performing operation 310 and/or prior to performing operation 320 to ensure that the connection to the WLAN 108 satisfies a threshold connection quality for supporting a video stream for the video call.

Subsequent to establishment of the second video stream, the wireless communication device 102 can be on a multi-way call with one audio stream and two parallel video streams. The wireless communication device 102 can, at operation 330, terminate the first video stream that is carried over the cellular network 106 after successfully establishing the second video stream. Termination of the first video stream can include the wireless communication device 102 sending a termination message for terminating the video stream to the remote communication device 104. Such termination message can, for example, be a session initiation protocol (SIP) message that can be used for terminating a session, such as a SIP BYE message for terminating the first video stream, a SIP re-invite message for inviting an audio only connection over the cellular network 106, or the like.

Operation 340 can include the wireless communication device 102 using the second video stream carried over the WLAN 108 and the audio stream carried over the cellular network 106 to continue the video call. In some example embodiments, the wireless communication device 102 can continue to display the first video stream while establishing the second video stream at operation 320 and can switch from displaying the first video stream (e.g., on a display of user interface 222) to displaying the second video stream prior to terminating the first video stream. In this regard, the video portion of the video call may be offloaded without degrading the user experience, as a user of the wireless communication device 102 may not notice an interruption in the video for the video call since the second video stream may be established and displayed prior to termination of the first video stream in some example embodiments. In embodiments in which RTCP and/or other common or otherwise compatible synchronization mechanism is used by the second video stream and the audio stream, the wireless communication device 102 can use the synchronization mechanism to enable synchronization of the presentation of the second video stream and the audio stream.

Figure 4:
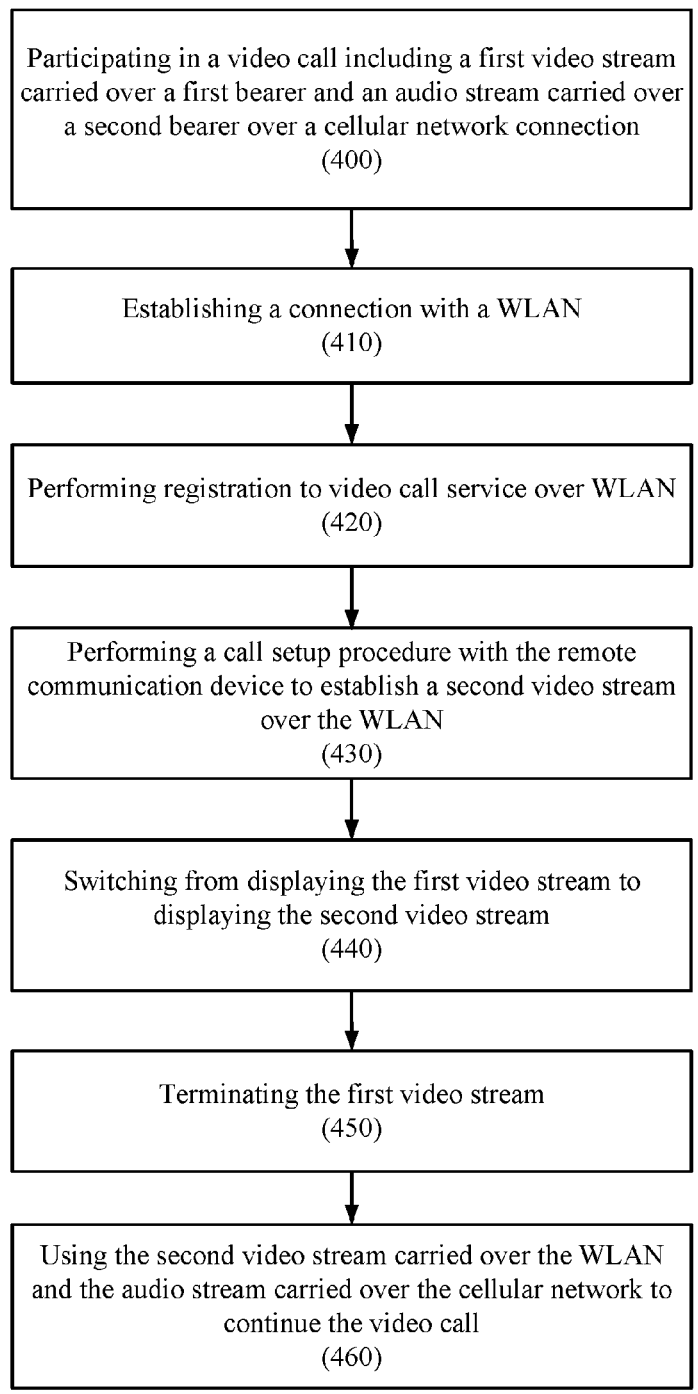
FIG. 4 illustrates a flowchart of operations that can be performed by a wireless communication device in accordance with another example method for offloading a video portion of a video call according to some example embodiments.

FIG. 4 illustrates a flowchart of operations that can be performed by a wireless communication device 102 in accordance with another example method for offloading a video portion of a video call according to some example embodiments. More particularly, FIG. 4 illustrates operations that can be performed in some embodiments in which video call service server 110 may be configured to support establishment and/or maintenance of a video call. One or more of processing circuitry 210, processor 212, memory 214, cellular interface 216, WLAN interface 218, or offloading module 220 can, for example, provide means for performing the operations illustrated in and described with respect to FIG. 4.

Operation 400 can include the wireless communication device 102 participating in a video call with the remote communication device 104 over a connection to the cellular network 106. The video call can include a first video stream carried over a first bearer and an audio stream carried over a second bearer over the connection to the cellular network 106. The video call may, for example, have originally been established on the cellular network 106, such as at a point at which the wireless communication device 102 was not within range of, or otherwise did not have an active connection to the WLAN 108. Alternatively, the video call may have been moved to the cellular network 106 from another network, such as from a WLAN after the wireless communication device 102 moved outside of a coverage range of the network on which the video call was originally established.

Operation 410 can include the wireless communication device 102 establishing a connection with the WLAN 108. Operation 420 can include the wireless communication device 102 performing a registration to a video call service over the WLAN 108. In this regard, the wireless communication device 102 can receive a new Internet Protocol (IP) address on the WLAN 108. Thus, a prior registration to the video call service server 110 for an IP address on the cellular network 106 may not be valid for the connection to the WLAN 108, and the wireless communication device 102 can register the new IP address to the video call service server 110, which can be configured to facilitate video call establishment between the wireless communication device 102 and remote communication device 104.

Operation 430 can include the wireless communication device 102 performing a call setup procedure with the remote communication device 104 to establish a second video stream for the video call over the WLAN 108. The video data content second video stream can be duplicative of the video stream carried over the cellular network 106. The second video stream can use a common synchronization mechanism and/or compatible synchronization mechanisms for the second video stream and the audio stream. For example, a real time transport protocol, such as, by way of non-limiting example, RTCP, supporting corresponding time stamps and/or other mechanism that can be used to synchronize audio and video packets exchanged over the separate video and audio streams can be used. In some example embodiments, such as the embodiment illustrated in and described below with respect to FIG. 5, the wireless communication device 102 can be configured to measure a signal strength and/or other quality of the WLAN 108 prior to performing one or more of operations 410-430 to ensure that the connection to the WLAN 108 satisfies a threshold connection quality for supporting a video stream for the video call.

Subsequent to establishment of the second video stream, the wireless communication device 102 can be on a multi-way call with one audio stream and two parallel video streams. The wireless communication device 102 and remote communication device 104 can initially display the first video stream. After successful establishment of the second video stream, the wireless communication device 102 and remote communication device 104 can switch from displaying the first video stream to displaying the second video stream, at operation 440. After switching to displaying the second video stream, the first video stream can be terminated, at operation 450. In this regard, by establishing the second video stream and switching to the second video stream prior to terminating the first video stream, continuity of the video call can be maintained during the offloading process without a noticeable interruption to the user. Termination of the first video stream can include the wireless communication device 102 sending a termination message for terminating the video stream to the remote communication device 104. Such termination message can, for example, be a session initiation protocol (SIP) message that can be used for terminating a session, such as a SIP BYE message for terminating the first video stream, a SIP re-invite message for inviting an audio only connection over the cellular network 106, or the like.

Operation 460 can include the wireless communication device 102 using the second video stream carried over the WLAN 108 and the audio stream carried over the cellular network 106 to continue the video call. In embodiments in which RTCP and/or other common or otherwise compatible synchronization mechanism is used by the second video stream and the audio stream, the wireless communication device 102 can use the synchronization mechanism to enable synchronization of the presentation of the second video stream and the audio stream.

Figure 5:
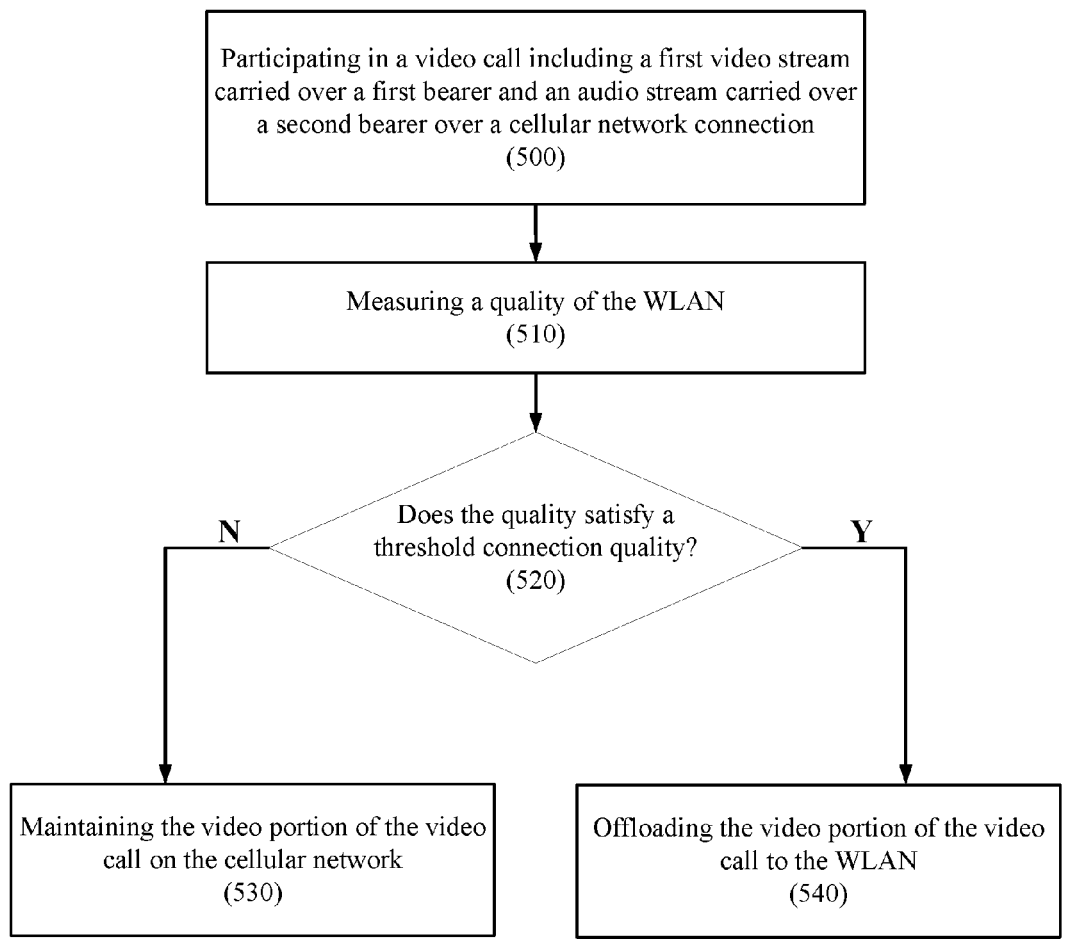
FIG. 5 illustrates a flowchart of operations that can be performed by a wireless communication device in accordance with an example method for selectively offloading a video portion of a video call based on a measured quality of a WLAN according to some example embodiments.

FIG. 5 illustrates a flowchart of operations that can be performed by a wireless communication device, such as wireless communication device 102, in accordance with an example method for selectively offloading a video portion of a video call based on a measured quality of a WLAN according to some example embodiments. One or more of processing circuitry 210, processor 212, memory 214, cellular interface 216, WLAN interface 218, or offloading module 220 can, for example, provide means for performing the operations illustrated in and described with respect to FIG. 5.

Operation 500 can include the wireless communication device 102 participating in a video call with the remote communication device 104 over a connection to the cellular network 106. The video call can include a first video stream carried over a first bearer and an audio stream carried over a second bearer over the connection to the cellular network 106. The video call may, for example, have originally been established on the cellular network 106, such as at a point at which the wireless communication device 102 was not within range of, or otherwise did not have an active connection to the WLAN 108. Alternatively, the video call may have been moved to the cellular network 106 from another network, such as from a WLAN after the wireless communication device 102 moved outside of a coverage range of the network on which the video call was originally established. In this regard, operation 500 can, for example, correspond to an embodiment of operation 300 and/or operation 400.

Operation 510 can include the wireless communication device 102 measuring a quality of the WLAN 108. For example, operation 510 may include measuring a signal strength, such as a received signal strength indicator (RSSI), and/or other quality of the WLAN 108. Operation 520 may include the wireless communication device 102 determining if the measured quality satisfies a threshold connection quality. For example, operation 520 may include determining if the measured quality supports a threshold throughput to support and/or otherwise guarantee a threshold quality for streaming video for the video call.

In an instance in which it is determined at operation 520 that the measured quality does not satisfy the threshold connection quality, the method can proceed to operation 530, which can include the wireless communication device 102 maintaining the video portion of the video call on the cellular network 106.

If, however, it is determined at operation 520 that measured quality does satisfy the threshold connection quality, the method can instead proceed to operation 540, which can include the wireless communication device 102 offloading the video portion of the video call to the WLAN. In this regard, operation 540 can include performance of one or more of operations 310-340 and/or one or more of operations 410-460.

Figure 6:
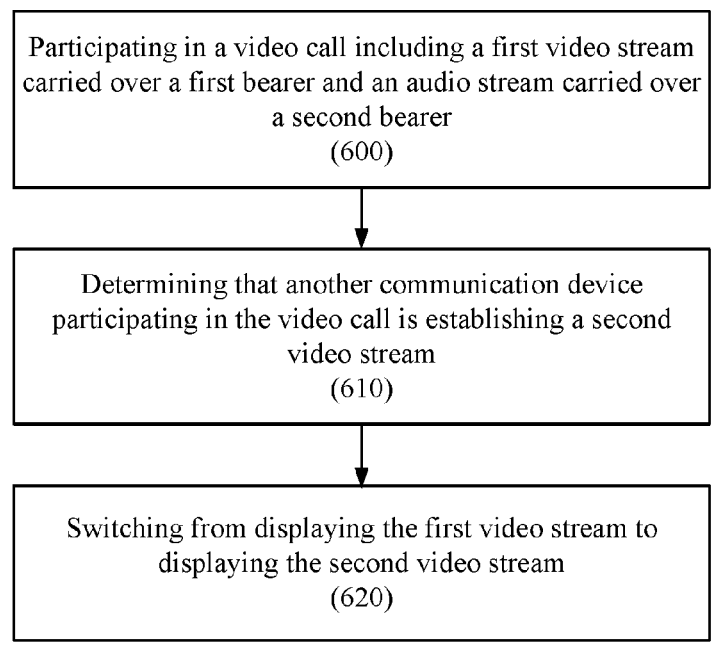
FIG. 6 illustrates a flowchart of operations that can be performed by a communication device in response to another device offloading a video portion of a video call according to some example embodiments.

FIG. 6 illustrates a flowchart of operations that can be performed by a communication device in response to another device offloading a video portion of a video call according to some example embodiments. In this regard, FIG. 6 illustrates operations that can be performed by remote communication device 104 in response to wireless communication device 102 offloading a video portion of a video call to WLAN 108, such as in accordance with one or more of the methods of FIGS. 3-5. In embodiments in which the remote communication device 104 is an embodiment of wireless communication device 102, one or more of processing circuitry 210, processor 212, memory 214, cellular interface 216, WLAN interface 218, or offloading module 220 can, for example, provide means for performing the operations illustrated in and described with respect to FIG. 6.

Operation 600 can include the remote communication device 104 participating in a video call including a first video stream carried over a first bearer and an audio stream carried over a second bearer. Operation 610 can include the remote communication device 104 determining that that another communication device participating in the video call (e.g., the wireless communication device 102) is establishing a second video stream. For example, operation 610 can include receiving a session invite for establishing a second video stream. The second video stream may have the same endpoint identifier, such as a FaceTime® ID, as the first video stream such that the remote communication device 104 can recognize that the second video stream is duplicative of the first video stream. Additionally or alternatively, as another example, operation 610 can include receiving an explicit indication that the wireless communication device 102 is establishing a second video stream to offload the video for the video call from a cellular network.

Operation 620 can include the remote communication device 104 switching from displaying the first video stream to displaying the second video stream. The switch can, for example, be performed prior to termination of the first video stream by the wireless communication device 102. As such, the second video stream may be used to continue the video call without interrupting the user experience of a user of the remote communication device 104.

Some example embodiments further provide for moving a video stream for a video call from the WLAN 108 to the cellular network 106. For example, if the wireless communication device 102 moves outside of coverage range of the WLAN 108, or if a connection quality of the WLAN 108 drops below a threshold, the video stream can be transitioned to the cellular network 106. Transitioning the video stream to the cellular network 106 from the WLAN 108 can, for example, include establishing a parallel video stream on the cellular network 106 and terminating the video stream on the WLAN 108 after successful establishment of the parallel video stream on the cellular network 106.

Figure 7:
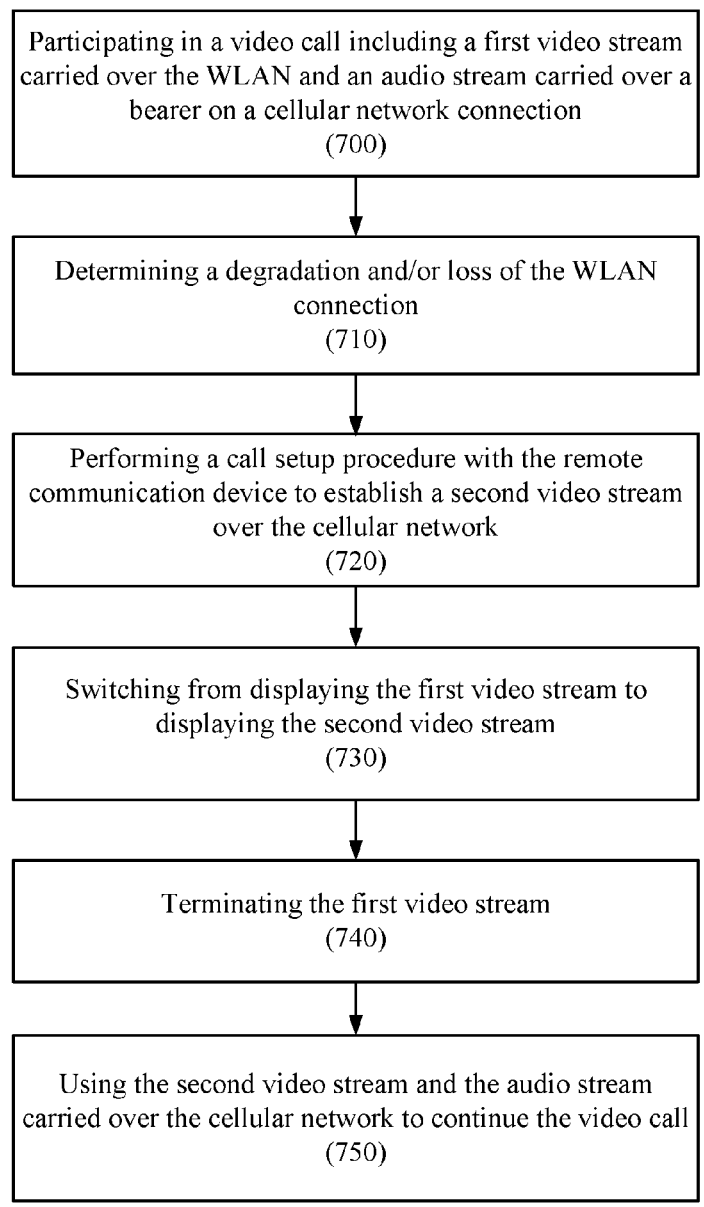
FIG. 7 illustrates a flowchart of operations that can be performed by a wireless communication device in accordance with an example method for moving a video portion of a video call from a WLAN to a cellular network according to some example embodiments.

FIG. 7 illustrates a flowchart of operations that can be performed by a wireless communication device 102 in accordance with an example method for moving a video portion of a video call from a WLAN, such as WLAN 108, to a cellular network, such as cellular network 106, according to some such example embodiments. One or more of processing circuitry 210, processor 212, memory 214, cellular interface 216, WLAN interface 218, or offloading module 220 can, for example, provide means for performing the operations illustrated in and described with respect to FIG. 7.

Operation 700 can include the wireless communication device 102 participating in a video call including a first video stream carried over the WLAN 108 and an audio stream carried over a bearer on a connection to the cellular network 106. Operation 710 can include the wireless communication device 102 determining a degradation and/or loss of the WLAN connection. For example, operation 710 can include determining that an RSSI and/or other signal quality of the WLAN 108 has deteriorated below a threshold connection quality for supporting the video stream for the video call.

Operation 720 can include the wireless communication device 102 performing a call setup procedure with the remote communication device 104 to establish a second video stream over the cellular network 106. The video data content of the second video stream can be duplicative of the video stream carried over the WLAN 108.

Subsequent to establishment of the second video stream, the wireless communication device 102 can be on a multiway call with one audio stream and two parallel video streams. The wireless communication device 102 can, at operation 730, switch from displaying the first video stream to displaying the second video stream.

Operation 740 can include the wireless communication device 102 terminating the first video stream. Termination of the first video stream can include the wireless communication device 102 sending a termination message for terminating the video stream to the remote communication device 104. Such termination message can, for example, be a session initiation protocol (SIP) message that can be used for terminating a session, such as a SIP BYE message for terminating the first video stream, a SIP re-invite message, or the like. Operation 750 can include the wireless communication device 102 using the second video stream carried over the cellular network 106 and the audio stream carried over the cellular network 106 to continue the video call.

The various aspects, embodiments, implementations or features of the described embodiments can be used separately or in any combination. Various aspects of the described embodiments can be implemented by software, hardware or a combination of hardware and software. The described embodiments can also be embodied as a computer readable medium (or mediums) storing computer readable code including instructions that can be performed by one or more computing devices. The computer readable medium may be associated with any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code may be stored and executed in a distributed fashion.

In the foregoing detailed description, reference was made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments. For example, it will be appreciated that the ordering of operations illustrated in the flowcharts is non-limiting, such that the ordering of two or more operations illustrated in and described with respect to a flowchart can be changed in accordance with some example embodiments. As another example, it will be appreciated that in some embodiments, one or more operations illustrated in and described with respect to a flowchart can be optional, and can be omitted.

Further, the foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. The description of and examples disclosed with respect to the embodiments presented in the foregoing description are provided solely to add context and aid in the understanding of the described embodiments. The description is not intended to be exhaustive or to limit the described embodiments to the precise forms disclosed. It will be apparent to one of ordinary skill in the art that many modifications, alternative applications, and variations are possible in view of the above teachings. In this regard, one of ordinary skill in the art will readily appreciate that the described embodiments may be practiced without some or all of these specific details. Further, in some instances, well known process steps have not been described in detail in order to avoid unnecessarily obscuring the described embodiments.

What is claimed is:

1. An apparatus for offloading a video portion of a video call session from a first wireless network to a second wireless network, the apparatus comprising:
   processing circuitry, comprising one or more processors and a memory storing computer-executable instructions that, when executed by the one or more processors, cause a wireless device to:
      participate in a video call with a remote device over a first connection via the first wireless network, wherein the video call comprises a first video stream and an audio stream communicated via the first wireless network;
      establish a second connection between the wireless device and the second wireless network;
      perform a call setup procedure with the remote device to establish a second video stream communicated via the second connection; and
      use the second video stream and the audio stream to continue the video call.

2. The apparatus of claim 1, wherein the first wireless network comprises a cellular network and the second wireless network comprises a wireless local area network (WLAN).

3. The apparatus of claim 1, wherein:
   the first video stream is communicated via the first network over a first bearer, and
   the audio stream is communicated via the first network over a second bearer.

4. The apparatus of claim 1, wherein the audio stream is communicated via a packet-based transmission for audio data.

5. The apparatus of claim 4, wherein the packet-based transmission comprises a Voice over Internet Protocol (VoIP) transmission.

6. The apparatus of claim 1, wherein execution of the computer-executable instructions further causes the wireless device to:
   terminate the first video stream after establishing the second video stream.

7. The apparatus of claim 6, wherein execution of the computer-executable instructions further causes the wireless device to:
   use the first video stream and the second video stream in parallel to continue the video call before terminating the first video stream.

8. The apparatus of claim 6, wherein execution of the computer-executable instructions further causes the wireless device to:
   display the first video stream while performing the call setup procedure; and
   switch from displaying the first video stream to displaying the second video stream before terminating the first video stream.

9. The apparatus of claim 1, wherein execution of the computer-executable instructions further causes the wireless device to:
   measure a quality of the second connection to the second wireless network before establishing the second video stream; and
   performing the call setup procedure with the remote device to establish the second video stream only when the quality of the second connection to the second wireless network satisfies a threshold connection quality.

10. The apparatus of claim 1, wherein execution of the computer-executable instructions further causes the wireless device to:
    register an Internet Protocol (IP) address or a device address with a video call service server before or during the video call to facilitate the call setup procedure with the remote device to establish the second video stream or to continue the video call using the second video stream.

11. The apparatus of claim 1, wherein execution of the computer-executable instructions further causes the wireless device to:
    send a termination message to the remote device before terminating the first video stream.

12. The apparatus of claim 11, wherein the termination message comprises one of a session initiation protocol (SIP) BYE message or a SIP re-invite message.

13. The apparatus of claim 1, wherein execution of the computer-executable instructions further causes the wireless device to use a real-time control protocol (RTCP) to enable synchronization of the second video stream and the audio stream.

14. A wireless device comprising:
    a first wireless interface configurable to communicate with a first wireless network via one or more antennas;
    a second wireless interface configurable to communicate with a second wireless network via the one or more antennas; and
    processing circuitry communicatively coupled to the first wireless interface and the second wireless interface and comprising one or more processors and a memory storing computer-executable instructions that, when executed by the one or more processors, cause the wireless device to:
       participate in a video call with a remote device over a first connection via the first wireless network, wherein the video call comprises a first video stream and an audio stream communicated via the first wireless network;
    establish a second connection between the wireless device and the second wireless network;
    perform a call setup procedure with the remote device to establish a second video stream communicated via the second connection; and
    use the second video stream and the audio stream to continue the video call.

15. The wireless device of claim 14, wherein:
    the first video stream is communicated via the first network over a first bearer, and
    the audio stream is communicated via the first network over a second bearer.

16. The wireless device of claim 14, wherein the audio stream is communicated via a packet-based transmission for audio data.

17. The wireless device of claim 14, wherein execution of the computer-executable instructions further causes the wireless device to:
- terminate the first video stream after establishing the second video stream.

18. The wireless device of claim 17, wherein execution of the computer-executable instructions further causes the wireless device to:
- use the first video stream and the second video stream in parallel to continue the video call before terminating the first video stream.

19. The wireless device of claim 17, wherein execution of the computer-executable instructions further causes the wireless device to:
- register an Internet Protocol (IP) address or a device address with a video call service server before or during the video call to facilitate the call setup procedure with the remote device to establish the second video stream or to continue the video call using the second video stream.

20. A method for offloading a video portion of a video call session from a first wireless network to a second wireless network, the method comprising:

by a wireless device:
- participating in a video call with a remote device over a first connection via the first wireless network, wherein the video call comprises a first video stream and an audio stream communicated via the first wireless network;
- establishing a second connection between the wireless device and the second wireless network;
- performing a call setup procedure with the remote device to establish a second video stream communicated via the second connection; and
- using the second video stream and the audio stream to continue the video call.

* * * * *